United States Patent
Fraccaroli

(10) Patent No.: US 6,745,054 B2
(45) Date of Patent: Jun. 1, 2004

(54) USER INTERFACE ASSEMBLY, AND ASSOCIATED METHOD, FOR ALERTING PLACEMENT OF A CALL TO A MOBILE STATION

(75) Inventor: Federico Fraccaroli, Irving, TX (US)

(73) Assignee: Nokia Corporation, Espoo (FI)

( * ) Notice: Subject to any disclaimer, the term of this patent is extended or adjusted under 35 U.S.C. 154(b) by 26 days.

(21) Appl. No.: 10/062,732

(22) Filed: Jan. 31, 2002

(65) Prior Publication Data

US 2003/0144037 A1 Jul. 31, 2003

(51) Int. Cl.[7] .................................................. H04B 1/38
(52) U.S. Cl. .................. 455/567; 455/569.1; 455/41.2; 455/508.6; 340/7.6; 340/7.61
(58) Field of Search ................................ 455/567, 568, 455/569, 41, 569.1, 569.2, 41.2, 568.6, 11.1; 340/7.6, 7.61

(56) References Cited

U.S. PATENT DOCUMENTS

| | | | |
|---|---|---|---|
| 5,590,417 A | 12/1996 | Rydbeck | |
| 5,751,820 A | 5/1998 | Taenzer | |
| 5,771,438 A | 6/1998 | Palermo et al. | |
| 5,912,925 A | 6/1999 | Palermo et al. | |
| 5,913,163 A | * 6/1999 | Johansson | 455/426 |
| 5,982,764 A | 11/1999 | Palermo et al. | |
| 6,112,103 A | 8/2000 | Puthuff | |
| 6,181,956 B1 | * 1/2001 | Koskan | 455/566 |
| 6,272,359 B1 | * 8/2001 | Kivela et al. | 455/567 |
| 6,337,972 B1 | * 1/2002 | Jones et al. | 340/7.57 |
| 6,377,823 B1 | * 4/2002 | Higuchi et al. | 455/567 |
| 6,405,027 B1 | * 6/2002 | Bell | 455/403 |
| 6,424,251 B1 | * 7/2002 | Byrne | 340/7.58 |
| 2002/0076073 A1 | 6/2002 | Taenzer et al. | |

FOREIGN PATENT DOCUMENTS

WO     WO 92/17991     10/1992

* cited by examiner

Primary Examiner—Nay Maung
Assistant Examiner—Alan T. Gantt

(57) ABSTRACT

A user interface assembly, and an associated method, for a mobile station. An earpiece assembly, worn by a user of a mobile station at which the user interface assembly is implemented, receives local radio signals, such as Bluetooth™-formatted signals, when placement of a call is detected at the mobile station. An annunciator, also positioned at the earpiece, generates an alert to alert the user of placement of the call to the mobile station. The alert forms a private alert instead of a general, public alert. The user of the mobile station is able to accept, or reject, acceptance of the call when privately alerted of delivery of the call to the mobile station.

15 Claims, 4 Drawing Sheets

_62_

| Telephone No. 1 ⎵74 | Mnemonic No. 1 ⎵76 |
|---|---|
| Telephone No. 2 | Mnemonic No. 2 |
| ⋮ | |
| Telephone No. N | Mnemonic No. N |

FIG. 2

USER INTERFACE ASSEMBLY, AND ASSOCIATED METHOD, FOR ALERTING PLACEMENT OF A CALL TO A MOBILE STATION

The present invention relates generally to a manner by which to alert a user of a mobile station of a call placed to the mobile station. More particularly, the present invention relates to a user interface assembly, and an associated method, that provides an annunciator that is worn by a user of the mobile station as part of an earpiece. An alert is generated when a call placed to the mobile station is detected thereat. Because the alert is generated at the earpiece, the alert forms a private alert. Loud and obtrusive call alerts are avoided as the alert, when sounded, is heard only by the user of the mobile station.

BACKGROUND OF THE INVENTION

Data is communicated during operation of a communication system between a sending station and a receiving station. A communication channel connects the sending and receiving stations together and defines a communication path upon which the data is communicated. If necessary, the data communicated by the sending station is first converted into a form to permit its communication upon the communication channel. And, the informational content of the data is recovered at the receiving station, once communicated thereto.

Many different types of communication systems have been developed and implemented to effectuate the communication of data pursuant to many different types of communication services, between two or more sending and receiving stations.

A radio communication system is a communication system in which the communication channel interconnecting the sending and receiving stations is defined upon a radio link, or radio interface, extending therebetween. The radio link is defined upon a portion of the electromagnetic spectrum. Because a radio link is used upon which to define the communication channel, a radio communication system is inherently mobile. A communication system that, instead, utilizes a conventional wireline connection upon which to define the communication channel, is typically of limited mobility due to the need to interconnect the sending and receiving stations by way of a conventional, wireline connection.

A cellular communication system is exemplary of a radio communication system, regularly utilized to communicate data, such as voice data. The communication network infrastructures of various different types of cellular communication systems have been installed throughout large geographical areas of the world. And, successive generations of cellular communication systems have been developed and implemented.

Use of a cellular communication system to communicate therethrough is generally permitted pursuant to a service subscription. A user, referred to as a subscriber, is permitted access to communication services effectuated by way of the network infrastructure of a cellular communication system pursuant to the service subscription thereto. Telephonic communication services, for instance, are effectuated by way of the network infrastructure of the cellular communication system.

The subscriber communicates with the network infrastructure of a cellular communication system through the use of a radio telephone, sometimes referred to as a mobile station. Both forward and reverse link communication channels are defined, and two-way communications are provided between the network infrastructure of the cellular communication system and the mobile station.

A mobile station is generally constructed in a manner such that its operation mimics, to a significant extent, operation of a conventional, wireline, telephonic station. For instance, when a subscriber originates a call, the subscriber enters the telephone number of the party that is to be called by way of a telephonic keypad. And, when a call, originated elsewhere, for placement to, i.e., termination at, the mobile station, the mobile station generates a ringing tone, or otherwise annunciates, the placement of the call thereto.

Typically, the ringing tone, or other annunciation, generated by the mobile station, is initiated responsive to reception, at the mobile station, of a paging signal. In some cellular communication systems, the paging signal is transmitted upon a controlled channel to which the mobile station is tuned at selected intervals. While control signaling, also is generated during call placement and acceptance of the call, the additional control signaling is generally transparent to the subscriber that utilizes the mobile station. And, the subscriber accepts a call placed to the mobile station in a manner generally analogous to a manner by which a user of a conventional wireline telephone accepts the call. That is, a switch is operated to select acceptance of the call.

Many mobile stations are of physical dimensions permitting their convenient carriage by a subscriber. Many mobile stations are of dimensions and weights permitting their carriage in a shirt pocket, purse, or the like, thereby to permit a call to be originated by the subscriber or a call terminated with the subscriber from any location at which the subscriber is positioned. That is, a subscriber need not be located in proximity to a conventional, wireline telephonic station in order to place or receive a call.

While the communication mobility provided by cellular communication systems through the use of mobile stations operable therein significantly expands communication opportunities, the convenience with which the mobile station can be carried might cause the subscriber inadvertently to carry the mobile station, in a turned-on condition, into an area in which the ringing tone, or other annunciation of placement of a call thereto should not be sounded.

While some mobile stations provide non-aural alerts, such alerts sometimes do not adequately alert the subscriber of the call placement thereto. For instance, some mobile stations include vibrating alerts that generate vibrating motions when a call placed to the mobile station is detected. Due to the limited annunciation provided by a vibrating annunciator, aural alerts are generally preferred.

An improved manner of providing aural alerts that permits the aural alert to be only a private alert would be advantageous.

It is in light of this background information related to placement of a call to a mobile station that the significant improvements of the present invention have evolved.

SUMMARY OF THE INVENTION

The present invention, accordingly, advantageously provides a user interface assembly, and an associated method, by which to alert a user of a mobile station of a call placed to the mobile station.

Through operation of an embodiment of the present invention, a manner is provided by which to annunciate placement of a call to the mobile station. The annunciator is worn by a user as part of an earpiece.

When a call placed to the mobile station is detected at the mobile station, an alert is generated by the annunciator. Because the alert is positioned at the earpiece, the alert forms a private alert. Loud and obtrusive call alerts, generated by conventional mobile station annunciator apparatus, are avoided as the alert, when sounded, is heard only by the user of the mobile station.

In one aspect of the present invention, an earpiece assembly is provided that can be worn by the user of the mobile station. Positioned at, and carried by, the earpiece assembly are a local radio receiver and an aural annunciator coupled to the local radio receiver. The local radio receiver operates to detect locally-generated radio signals that are generated when detection is made at the mobile station of placement of a call to the mobile station. When detection is made of the locally-generated radio receive signals, an indication of the detection is provided to the aural annunciator. The aural annunciator aurally annunciates the detection. By aurally annunciating the detection, the user of the mobile station, wearing the earpiece assembly, is alerted to the placement of the call to the mobile station.

In another aspect of the present invention, the locally-generated radio receive signals also include indicia of the identity of the calling party. Indicia associated with the identity of the calling party is detected by the local radio receiver, and the aural annunciator is caused to generate an alert that audibly indicates the identity of the calling party. Again, because the audible alert is generated at an earpiece assembly worn by a user of the mobile station, the audible alert is a private alert, not a loud and obtrusive, general-call alert generated during typical operation of conventional mobile stations having conventional annunciator apparatus.

In another aspect of the present invention, a local radio-signal transmitter is positioned at the mobile station. The local radio-signal transmitter operates responsive to detection at the mobile station of placement of the call thereto. The local radio-signals generated and transmitted by the local-signal radio transmitter are transmitted to the local radio-signal receiver positioned at the earpiece, thereafter to be annunciated by the annunciator carried by the earpiece assembly. The local radio signal forms, for example, a Bluetooth™-formatted signal, and the local radio transmitter and receiver comprise Bluetooth™ devices. Alternately, the local radio signals form IEEE 802.11-formatted signals, or signals generated pursuant to another communication standard.

In another aspect of the present invention, the aural annunciation generated by the annunciator forming part of the earpiece includes an announcement of the identity of the calling party. The call signaling, including the paging signal generated pursuant to a call request initiated by the calling party for termination at the mobile station, includes indicia identifying the calling party. The indicia identifying the calling party is detected by a caller identification detector at the mobile station. A database contained at the mobile station includes a listing in which the indicia identifying the calling party, such as by phone number, is indexed together with mnemonics associated with the identifying indicia. The mnemonic index together with the identifying indicia is retrieved from the database. And the local transmitter, positioned at the mobile station, generates the local-radio signals that are representative of the mnemonic retrieved from the database. The local radio receiver positioned at the earpiece assembly, upon detection of the local-receive signals, operates upon such signals and provides the signals to the annunciator at which the mnemonic is converted into audio form to be detected by the user of the mobile station. Alternately, or if no mnemonic is contained in the database, the telephone number of the calling party is communicated by the local radio transmitter, and the audio alert generated by the annunciator is formed of the telephone number of the calling party.

When the user of the mobile station hears the alert generated by the annunciator, the user is able to elect whether to accept the call. If the call is accepted, forward link signals sent by the calling party to the mobile station are also provided by way of the local radio transmitter and are converted into audio form by the annunciator. And, if the user elects not to accept the call, the call refusal is effectuated in conventional manner such as by actuation by an appropriate actuation key of the mobile station. A private alert of the placement of a call to the mobile station is thereby provided.

In these and other aspects, therefore, a user interface assembly, and an associated method, is provided for a mobile station operable in a radio communication system at least to receive a call placed thereto by a calling party. The call is originated by an originating station. A user interface assembly at least alerts a user of the mobile station of placement of the call thereto. A local radio receiver element is positionable to receive local radio signals representative of call termination at the mobile station. The local radio signals are generated responsive to detection at the mobile station of the call thereto. An aural annunciator is coupled to the local radio receiver element. The aural annunciator is operable responsive to detection at the local radio receiver element of the placement of the call to the mobile station. The aural annunciator annunciates aurally, in a selected manner, the detection thereat of the call. An earpiece supports the local radio receiver element and the aural annunciator. The earpiece, together with the local radio receiver element and the aural annunciator, are wearable by the user, positionable by the user to permit private alert through the aural annunciation of the aural annunciator to the user of the detection of the call placed to the mobile station.

A more complete appreciation of the present invention and the scope thereof can be obtained from the accompanying drawings that are briefly summarized below, the detailed description of the presently preferred embodiments of the invention, and the appended claims.

BRIEF DESCRIPTION OF THE DRAWINGS

FIG. 2 illustrates a functional representation of a database listing forming a portion of a user interface assembly of the present invention.

DETAILED DESCRIPTION

Figure 1:
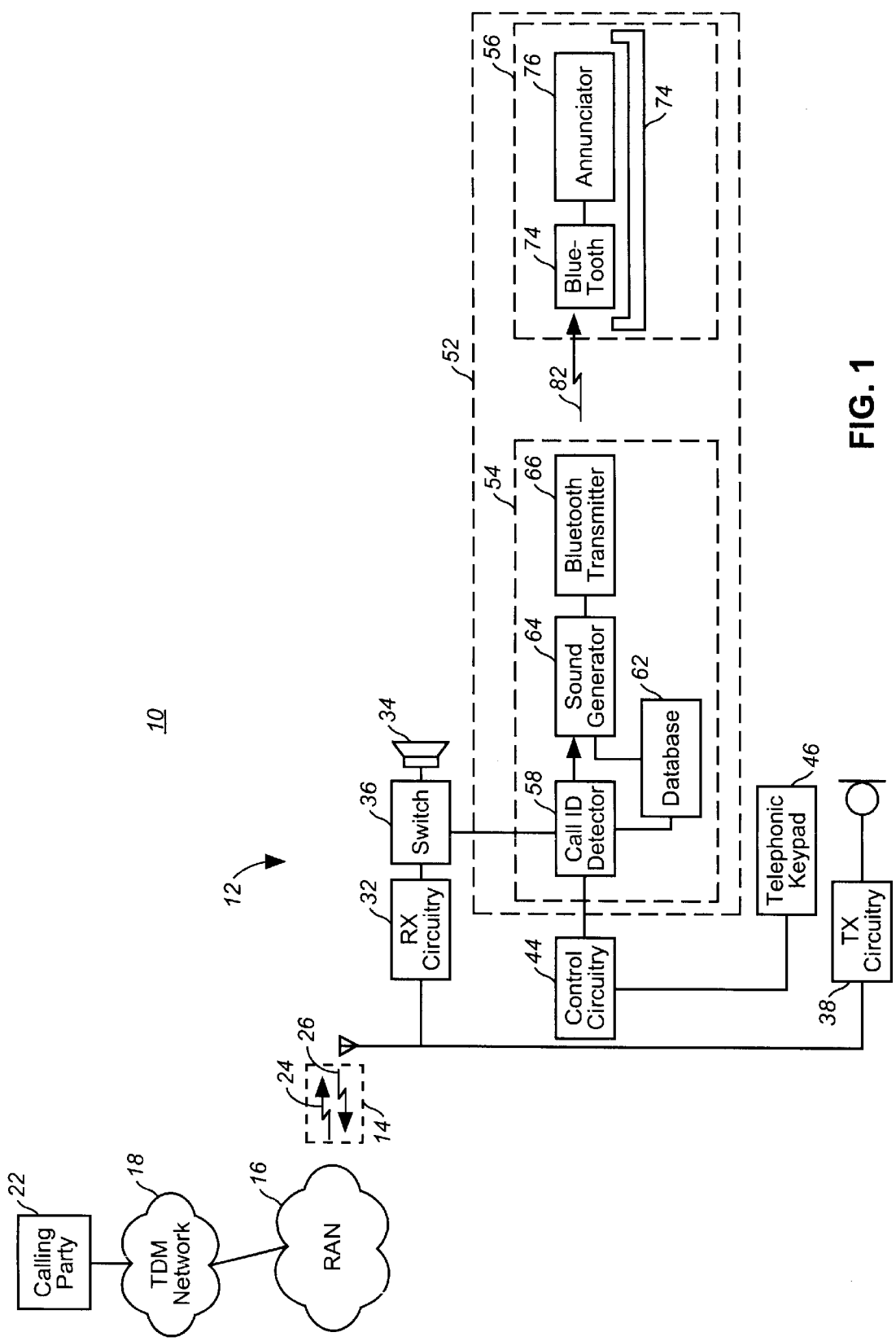
FIG. 1 illustrates a functional block diagram of a mobile station operable pursuant to an embodiment of the present invention to communicate in a cellular, or other radio, communication system.

Referring first to FIG. 1, a communication system, shown generally at 10, provides for radio communications with a mobile station 12. Communications are effectuated with the mobile station by way of a radio link 14 defining a radio interface between the mobile station 12 and network infrastructure of the communication system.

The network infrastructure includes a radio access network (RAN) part 16 and a time domain multiplexing (TDM) network part 18. The network parts 16 and 18 are connected together, such as by way of a gateway (not shown) that forms part of the radio access network. A calling party 22 is here shown to be connected to the TDM network part 18. The calling party is representative of a telephonic station at which a call is placed to the mobile station 12 to be terminated thereat.

The positioning of the calling party, as well as the formation of the network part 18 as a time domain multiplexing network, are exemplary only. The network part of the communication system can alternately be represented in other manners.

During a communication session between the calling party and the mobile station, forming a called party, communication channels are allocated upon the radio link 14 to effectuate communication. Data that is communicated by the network infrastructure to the mobile station is routed through the network infrastructure and upon the allocated communication channels defined upon the radio link. Data communicated by the calling party to the called party is referred to as forward link data, communicated upon forward link channels, and data communicated by the mobile station to the calling party is referred to as reverse link data, communicated upon reverse link channels. The forward link defined upon the radio link 14 is represented in the figure by the arrow 24, and the reverse link defined thereon is represented by the arrow 26.

The mobile station forms a radio transceiver capable of transceiving the forward and reverse link signals pursuant to a communication session with the calling party. The mobile station includes a receive part, here including receive circuitry 32. The receive circuitry operates to detect the signals sent thereto upon the forward link of the radio link. The receive part of the mobile station also includes a primary acoustic transducer 34, coupled to the receive circuitry 32 by way of a switch element 36. Selection of the switch position of the switch element 36, certain of the receive signals received by the receive circuitry are converted into audio form by the acoustic transducer during telephonic communication of the mobile station with the calling party 22.

The mobile station also includes a transmit portion including transmit circuitry 38. Data originated at the mobile station, here by way of a microphone element 42, is converted into a form to permit its communication upon reverse links 26, thereafter to be communicated to the calling party during a telephonic communication session.

The mobile station also includes control circuitry 44 coupled to both the receive and transmit circuitry 32 and 38, respectively. The mobile station further includes a telephonic keypad actuator 46 permitting user actuation of selected keys thereof. The telephonic keypad is coupled to the control circuitry, and the control circuitry is coupled to the telephonic keypad to receive indications of actuation of the actuation keys of the keypad.

The mobile station further includes an assembly 52 of an embodiment of the present invention. The assembly includes a first part 54 that is positioned together with the mobile station and a second part 56 that is physically separated therefrom. The first part includes a call identification detector 58, a database 62, a sound generator 64, and a local radio transmitter, here a Bluetooth™ transmitter 66.

The second part 56 of the assembly is housed at an earpiece assembly, here represented at 72, supports a local radio receiver, here a Bluetooth™ receiver 74, and an acoustic transducer 76 forming an aural annunciator.

The assembly 54 operates, pursuant to an embodiment of the present invention, to provide a private alert of placement of a call to the mobile station to a user wearing the earpiece assembly of the second part 56 of the assembly 52. Responsive to the alert provided to the user, the user selectably accepts, or rejects, the call, such as through appropriate actuation of an actuation key of the telephonic keypad 46.

When a call is placed by the calling party 22, a paging signal is sent to the mobile station. The paging signal is detected by the receive circuitry, and indications of the paging signal are provided to the first part 54 of the assembly. The call identification detector operates to detect the identity of the calling party. Here, the call identification detector accesses the database 62 to retrieve information associated with the identity of the calling party. Pursuant to the paging of the mobile station, the telephonic identity of the calling party is, for instance, provided to the mobile station. The telephonic number of the calling party is used to obtain personalized information associated with the calling party, such as the name of the calling party.

The retrieved information is provided to the sound generator that generates coded sound representations, here both to generate an alert and also to identify the calling party. The coded representations generated by the sound generator provided to the Bluetooth™ transmitter 66. The Bluetooth™ transmitter generates local radio signals, here Bluetooth™ signals 82, that are transmitted and detected by the Bluetooth™ receiver housed together with the earpiece assembly, worn by the user of the mobile station. The Bluetooth™ receiver forwards on the receive signals to the annunciator 76.

The annunciator generates an audio alert, detectable by the user who wears the earpiece assembly. When a mnemonic associated with the telephonic number of the calling party is retrieved from the database and representations thereof are communicated to the Bluetooth™ receiver, the aural annunciator 76 generates a audio sound corresponding to the mnemonic.

Thereby, the user of the mobile station is able to determine, without even looking at the mobile station, the identity of the calling party. An informed decision whether to accept, or reject, the call can thereby be made. And, as the audio alert is detectable only by the wearer of the earpiece assembly, a loud ringing tone, typically required of conventional mobile stations to alert a user of the placement of the call thereto is avoided.

Subsequent to acceptance of the call, the assembly is further operable to provide the forward link signals, in audible form, to the user of the mobile station. The switch element 36 is selectably switched into position, such as through control action by the control circuitry 44, to route the forward link signals received by the receive circuitry through the switch 36 and to the assembly 54. Alternately, of course, normal operation of the mobile station is also permitted to provide the audio signals to the acoustic transducer 34, in conventional manner of operation of the mobile station pursuant to a telephonic session.

In a further implementation, the Bluetooth devices 66 and 74 form portions of Bluetooth transceivers. And, an actuator (now shown in the figure) is connected to the earpiece-located Bluetooth transceiver. Actuation of the actuator by the user upon an alert generated by the annunciator is made to accept, or reject, the call. The user is able thereby to reject the call without accessing the body of the mobile station.

FIG. 2 illustrates the database 62 of an exemplary implementation of an embodiment of the present invention. The database is embodied at a memory element, either internal to the control circuitry, or a separate memory device of the mobile station. And, in an alternate implementation, the database is located remote from the mobile station, such as at a server located in the radio access network. The database includes a listing, here represented by a first column of telephonic numbers associated with calling parties. Here, the telephonic numbers are numbers formatted pursuant to the North American number plan. Other numbers, of course, can also be stored at the database. The telephonic numbers are listed in the columns 74. Indexed together therewith are mnemonics, here listed in the column 76, associated with individual ones of the telephonic numbers. When the call identification detector accesses the database, the mnemonic associated with the telephone number is retrieved from the database and annunciated to the user of the mobile station by way of the aural annunciator 76. The sound generator 64 in this implementation acts as a text-to-voice transducer to generate signals that, when transduced, form acoustic signals corresponding to the retrieved mnemonic. And, alternately, when indicia corresponding to the calling party calling digits are provided to the sound generator, operation of the sound generator, again acts as a text-to-speech converter to generate signals corresponding to the detected numeric identity of the calling party. When transduced into acoustic form by the annunciator, the user is provided, in acoustic form, the sequence of numbers defining the numeric identity.

Figure 3:
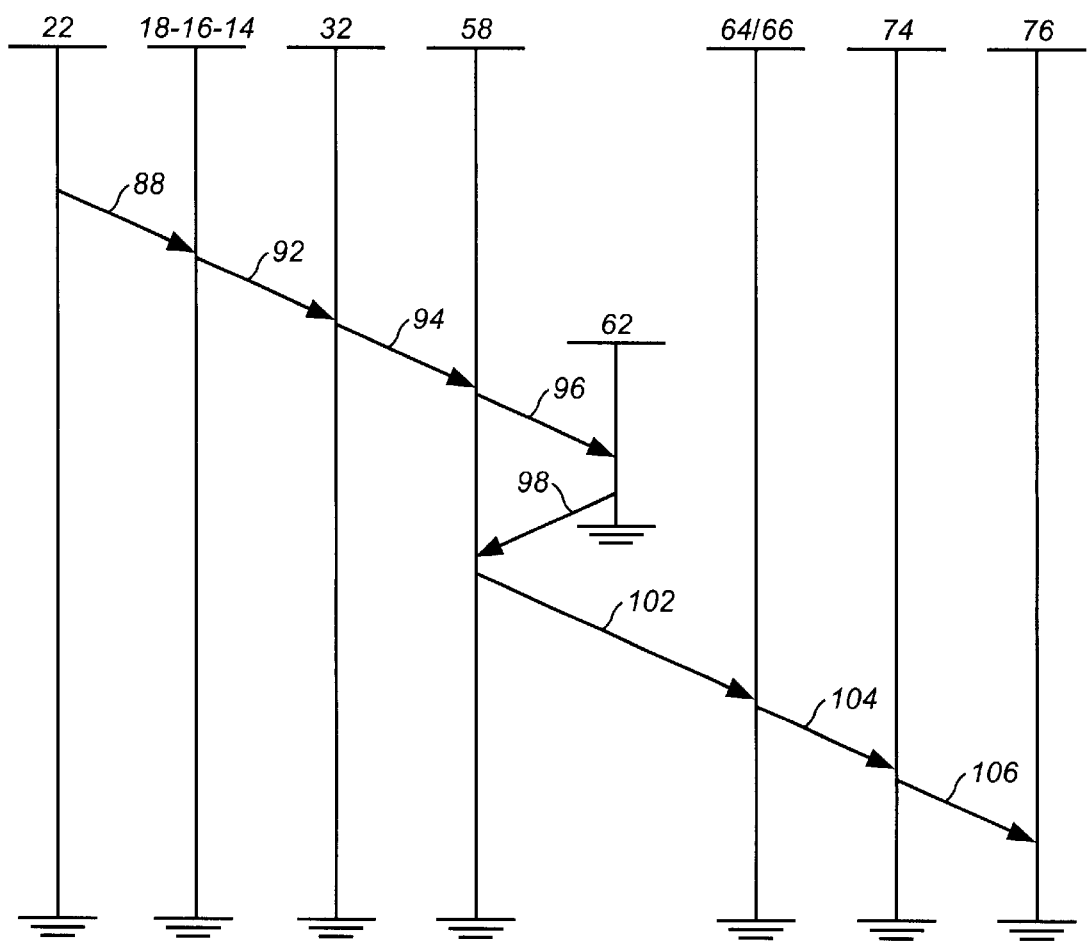
FIG. 3 illustrates a message sequence diagram illustrating signaling generated during operation of the mobile station shown in FIG. 1.

FIG. 3 illustrates a message sequence diagram, shown generally at 86, that shows the routing of signals generated during operation of the communication system 10 during operation of an embodiment of the present invention. Here, the calling party 22 initiates a call to the mobile station, a call request, here indicated by the segment 88, is generated by the calling party and is routed through the network infrastructure of the communication system. A paging signal is generated, here indicated by the segment 92, and transported upon the radio interface extending to the mobile station. Upon detection at the receive circuitry 32 of the mobile station, the indications thereof are provided to the call identification detector 58. Routing of the indications is represented by the segment 94.

Here, the call identification detector accesses the database 62, indicated by the segment 96, and retrieves, indicated by the segment 98, a mnemonic associated with the telephonic number. The mnemonic is provided, indicated by the segment 102, to the sound generator 64, that forms a coded representation of the mnemonic, that is thereafter transmitted, indicated by the segment 104, to the Bluetooth™ receiver 74. The Bluetooth™ receiver provides the received signal to the annunciator 76. And, the annunciator annunciates a private alert to the user of the mobile station.

Figure 4:
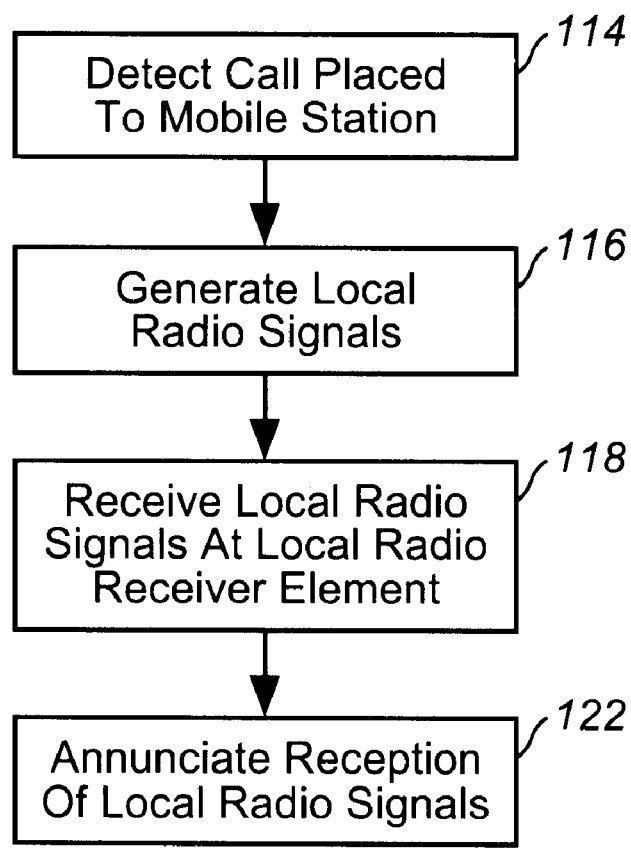
FIG. 4 illustrates a method flow diagram listing the method steps of the method of an embodiment of the present invention.

FIG. 4 illustrates a method flow diagram, shown generally at 112, representative of the method of operation of an embodiment of the present invention. The method alerts the user of a mobile station of placement of a call thereto.

First, and as indicated by the block 114, placement of the call to the mobile station is detected. Then, and as indicated by the block 116, local radio signals representative of detection of the placement of the call to the mobile station are generated.

Thereafter, and as indicated by the block 118, the local radio signals are received at a local radio receiver element worn by a user of the mobile station. And, as indicated by the block 122, reception of the local radio signals at the local radio receiver is aurally annunciated at an aural annunciator worn by the user.

The previous descriptions are of preferred examples for implementing the invention, and the scope of the invention should not necessarily be limited by this description. The scope of the present invention is defined by the following claims:

In the claims:

1. In a mobile station operable in a radio communication system at least to receive a call placed thereto by a calling party, the call originated by an originating station, the mobile station comprising a system receive part operable at least to detect placement of the call to the mobile station and to detect call information communicated to the mobile station during a communication session formed pursuant to the call, an improvement of a user interface assembly at least for alerting a user of the mobile station of placement of the call thereto, said user interface assembly comprising:

a local radio transmitter element positioned at the mobile station, said local radio transmitter coupled to the system receive part to receive indications of detection at the system receive part of the call placed thereto, said local radio transmitter for generating the local radio signals representative of the call termination and responsive to the detection at the mobile station of the placement of the call thereto, and the local radio signals further selectably representative of the call information communicated to the mobile station during the communication session;

a caller identity detector coupled to the system receive part of the mobile station, said caller identity detector for detecting an indicia of an identity of the calling party;

a database containing a listing of indicia of identities of selected calling parties indexed together with mnemonics associated with the selected calling parties;

a signal generator coupled to said system receive part and to said caller identity detection to receive the indicia of the identity of the calling party, said signal generator for generating a selected signal of selected signal characteristics responsive to the detection at the mobile station of the placement of the call thereto, the selected signal characteristics of the selected signal selected responsive to a mnemonic associated with the indicia of the identity of the calling party contained in the listing and detected by said caller identity detector;

a local radio receiver element positionable to receive local radio signals representative of call termination at the mobile station, the local radio signals generated responsive to detection at the mobile station of the call thereto;

an aural annunciator coupled to said local radio receiver element by way of said local radio transmitter element, said aural annunciator, operable responsive to detection at said local radio receiver element of the placement of the call to the mobile station, for aurally annunciating, in a selected manner to the detection thereat of the call; and an earpiece for supporting said local radio receiver element and said aural annunciator, said earpiece, together with said local radio receiver element and said aural annunciator wearable by the user, positionable by the user to permit private alert through aural annunciation of said aural annunciator to the user of the detection of the call placed to the mobile station.

2. The user interface assembly of claim 1 wherein the mnemonic associated with the indicia of the identity of the calling party comprises a name of a user of the calling party, and wherein said aural annunciator annunciates sounds corresponding to the name of the user of the calling party.

3. The user interface assembly of claim 1 further comprising a user input actuator selectably actuable by a user of the mobile station, first selected actuation of said user input actuator causing termination of generation of the selected signal by said signal generator.

4. The user interface assembly of claim 3 wherein second selected actuation of said user input actuator causes call acceptance of the call placed to the mobile station.

5. The user interface assembly of claim 3 wherein second selected actuation of said user input actuator causes the selected characteristics of the selected signal generated by said signal generator to alter magnitude levels of aural annunciations made by said aural annunciator.

6. In a method for communicating with a mobile station operable in a radio communication system at least to receive a call placed thereto by a calling party, the call originated by an originating station, an improvement of a method at least for alerting a user of the mobile station of placement of the call thereto, said method comprising:

detecting the placement of the call to the mobile station;

generating local radio signals comprised of Bluetooth™-formatted signals representative of detection of the placement of the call to the mobile station; receiving the local radio signals at a local radio receiver element worn by the user; and aurally annunciating, in a selected manner, comprising generating sounds representative of mneumonics identifying the reception of the local radio signals at the local radio receiver, at an aural annunciator worn by the user.

7. The method of claim 6 wherein the local radio receiver that receives the local radio signals during said operation of receiving and the aural annunciator that annunciates the reception during said operation of aurally annunciating are together supported at an earpiece assembly wearable at an ear of the user.

8. The method of claim 6 wherein annunciations made during said operation of annunciating privately alert the user of the detection of the call placed to the mobile station.

9. In a mobile station operable in a radio communication system at least to receive a call placed thereto by a calling party, the call originated by an originating station, the mobile station comprising a system receive part operable at least to detect placement of the call to the mobile station and to detect call information communicated to the mobile station during a communication session formed pursuant to the call, an improvement of a user interface assembly at least for alerting a user of the mobile station of placement of the call thereto, said user interface assembly comprising:

a local radio transmitter element positioned at the mobile station, said local radio transmitter coupled to the system receive part to receive indications of detection at the system receive part of the call placed thereto, said local radio transmitter for generating the local radio signals representative of the call termination and responsive to the detection at the mobile station of the placement of the call thereto, and the local radio signals further selectably representative of the call information communicated to the mobile station during the communication session;

a local radio receiver element positionable to receive local radio signals representative of call termination at the mobile station, the local radio signals generated responsive to detection at the mobile station of the call thereto;

an aural annunciator coupled to said local radio receiver element by way of said local radio transmitter element, said aural annunciator, operable responsive to detection at said local radio receiver element of the placement of the call to the mobile station, for aurally annunciating, in a selected manner to the detection thereat of the call; and an earpiece for supporting said local radio receiver element and said aural annunciator, said earpiece, together with said local radio receiver element and said aural annunciator wearable by the user, positionable by the user to permit private alert through aural annunciation of said aural annunciator to the user of the detection of the call placed to the mobile station.

10. The user interface assembly of claim 9 wherein the local radio signals generated by said local radio transmitter comprise Bluetooth™-formatted signals and wherein said local radio transmitter comprises a Bluetooth™ transmitter.

11. The user interface assembly of claim 9 wherein the local radio signals to which said local receiver element is positionable to receive comprise Bluetooth™-formatted signals and wherein said local radio receiver comprises a Bluetooth™ receiver.

12. The user interface assembly of claim 9 further comprising a signal generator coupled to said system receive part, said signal generator for generating a selected signal of selected signal characteristics responsive to the detection at the mobile station of the placement of the call thereto.

13. The user interface assembly of claim 12 wherein said local radio transmitter is coupled to said signal generator to receive indications of the selected signal, of the selected signal characteristics, and wherein the local radio signals representative of the call termination transmitted by said local radio transmitter are representative of the selected signal generated by said signal generator.

14. The user interface assembly of claim 12 further comprising a caller identity detector coupled to the system receive part of the mobile station, said caller identity detector for detecting an indicia of an identity of the calling party.

15. The user interface assembly of claim 14 wherein said signal generator is coupled to said caller identity detector to receive the indicia of the identity of the calling party and wherein the selected characteristics of the selected signal are selected responsive to the indicia detected by said caller identity detector.

* * * * *